United States Patent
Zhang

(10) Patent No.: US 9,787,755 B2
(45) Date of Patent: Oct. 10, 2017

(54) METHOD AND DEVICE FOR BROWSING NETWORK DATA, AND STORAGE MEDIUM

(71) Applicant: TENCENT TECHNOLOGY (SHENZHEN) COMPANY LIMITED, Shenzhen, Guangdong (CN)

(72) Inventor: Lei Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 180 days.

(21) Appl. No.: 14/750,490

(22) Filed: Jun. 25, 2015

(65) Prior Publication Data
US 2015/0295991 A1  Oct. 15, 2015

Related U.S. Application Data

(63) Continuation of application No. PCT/CN2014/079598, filed on Jun. 10, 2014.

(30) Foreign Application Priority Data

Jun. 25, 2013  (CN) .......................... 2013 1 0256687

(51) Int. Cl.
*H04L 29/08* (2006.01)
*H04L 29/06* (2006.01)
*G06F 17/30* (2006.01)

(52) U.S. Cl.
CPC ........ *H04L 67/02* (2013.01); *G06F 17/30902* (2013.01); *H04L 67/1095* (2013.01);
(Continued)

(58) Field of Classification Search
CPC ........... G06F 17/30902; G06F 2216/05; H04L 67/02; H04L 67/1095; H04L 67/2804; H04L 67/2828; H04L 67/36; H04L 69/04
(Continued)

(56) References Cited

U.S. PATENT DOCUMENTS

| 6,842,768 B1 * | 1/2005 | Shaffer ................... H03M 7/30 |
| | | 709/203 |
| 7,174,055 B2 * | 2/2007 | Hori .................. G06F 17/30817 |
| | | 348/231.2 |

(Continued)

FOREIGN PATENT DOCUMENTS

| CN | 1960547 | 5/2007 |
| CN | 101304428 | 11/2008 |
| CN | 102684986 | 9/2012 |

OTHER PUBLICATIONS

International Search Report for PCT/CN2014/079598, mailed Aug. 20, 2014, 2 pages.

*Primary Examiner* — Alina N Boutah
(74) *Attorney, Agent, or Firm* — Knobbe Martens Olson & Bear LLP

(57) ABSTRACT

Disclosed are a method and a device for browsing network data, and a storage medium, and the method is operable on a device for browsing network data and includes: requesting for acquisition of network data, which includes thumbnail media data used for the thumbnail display of original media data; acquiring the thumbnail media data and data amount information of the original media data corresponding to the thumbnail media data; and displaying the thumbnail media data and the data amount information. By the disclosure, a user of an Internet terminal may obtain the relevant information of the original media data, so that unnecessary data acquiring operations by the user may be reduced, the waste of network traffic is reduced and the standby time of the Internet terminal is prolonged.

11 Claims, 9 Drawing Sheets

(52) U.S. Cl.
CPC ...... *H04L 67/2804* (2013.01); *H04L 67/2828* (2013.01); *H04L 67/36* (2013.01); *H04L 69/04* (2013.01); *G06F 2216/05* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 7,243,079 B1* | 7/2007 | Manolis | ............ | G06F 17/30017 705/26.81 |
| 2002/0154558 A1* | 10/2002 | Urata | ..................... | G06Q 20/12 365/200 |
| 2004/0102993 A1* | 5/2004 | Yoshida | ............... | G06Q 30/012 705/14.19 |
| 2004/0181662 A1* | 9/2004 | Kanai | ..................... | H04L 63/08 713/155 |
| 2005/0099518 A1* | 5/2005 | Mihara | ............... | H04N 1/0044 348/333.05 |
| 2005/0254072 A1* | 11/2005 | Hirai | ..................... | G06T 3/4092 358/1.2 |
| 2007/0058872 A1* | 3/2007 | Jang | ..................... | H04N 19/44 382/233 |
| 2009/0164567 A1* | 6/2009 | Hara | ..................... | G06F 3/0482 709/203 |
| 2010/0123732 A1* | 5/2010 | Jenks | ..................... | H04N 9/12 345/592 |
| 2011/0047190 A1* | 2/2011 | Lee | ..................... | H04L 67/1095 707/803 |
| 2011/0289136 A1* | 11/2011 | Klassen | ............. | H04N 1/32101 709/203 |
| 2012/0038625 A1* | 2/2012 | Kim | ..................... | G06F 3/04815 345/419 |
| 2012/0075671 A1* | 3/2012 | Ogawa | ............... | H04N 1/00204 358/1.15 |
| 2012/0278448 A1* | 11/2012 | Wang | ................ | G06F 17/30902 709/219 |
| 2012/0301032 A1* | 11/2012 | Kawanishi | ........ | G06F 17/30247 382/190 |
| 2015/0215402 A1* | 7/2015 | Matsushima | ..... | G06F 17/30017 709/201 |
| 2015/0312854 A1* | 10/2015 | Iwaki | ................ | H04W 52/0229 455/574 |

* cited by examiner

Indian Media Praise Mrime Minister Keqiang LI's First Visiting Stop In
India: Holding Hands Between Dragon And Elephant Means Significantly Political News
Legal Evening news [Micro-blogs] by Chenhan XU   2013-05-19 13:58   To Share Original image size: 1 Megabits Indian Media Praise Mrime Minister Keqiang LI's First Visiting Stop In
India: Holding Hands Between Dragon And Elephant Means Significantly Political News
Legal Evening news [Micro-blogs] by Chenhan XU  2013-05-19 13:58  To Share Original image size:   Estimated download time:
1 Megabits                    20 seconds

METHOD AND DEVICE FOR BROWSING NETWORK DATA, AND STORAGE MEDIUM

CROSS-REFERENCE TO RELATED APPLICATIONS

This application claims priority to and is a continuation application of PCT/CN2014/079598, filed on Jun. 10, 2014 and entitled "METHOD AND DEVICE FOR BROWSING NETWORK DATA, AND STORAGE MEDIUM", which claims the benefit and priority of Chinese Patent Application No. 201310256687.0, entitled "METHOD AND DEVICE FOR BROWSING NETWORK DATA" and filed on Jun. 25, 2013. The entire disclosures of each of the above applications are incorporated herein by reference.

TECHNICAL FIELD

The present disclosure relates to the field of Internet technologies, and in particular, to a method and a device for browsing network data, and a storage medium.

BACKGROUND

With the development of Internet technologies, information acquiring manners and communication manners are greatly enriched by various network applications. To improve the speed of acquiring network data in the Internet field, the network transmission speed is improved continually via developing communication technologies, and at the same time, the efficiency of acquiring information by terminal equipment is improved by lowering the amount of data to be transmitted. For example, in the prior art, original media data (for example, an image or a video) in web page data or other network data (e.g. blog or micro-blog data) is typically replaced with thumbnail media data (i.e., an image, a video, or a part of a video with a less data amount), thereby reducing the overall data amount of the web page data or other network data, and improving the data acquiring speed. At the same time, a link to the original media data is further embedded in the web page data or other network data, so that any user interested in the original media data may acquire the original media data according to the link. Such a network data browsing manner has been widely applied in the various existing Internet applications.

However, the existing network data browsing manner is not favourable for a traffic-sensitive user to acquire network data; moreover, it may happen to a user acquiring the original media data that the acquired media data is undesired for browsing, as a result, meaningless power consumption is caused by the data acquisition at the Internet terminal equipment, and the standby time of the Internet terminal equipment is shortened.

SUMMARY

Therefore, embodiments of the disclosure put forward a method and a device for browsing network data, and a storage medium, to reduce the network traffic waste caused for browsing network data and prolong the standby time of Internet terminal equipment.

On a first aspect, an embodiment of the disclosure provides a method for browsing network data, and the method is operable on a device for browsing network data and includes:

requesting for acquisition of network data, which includes thumbnail media data used for the thumbnail display of original media data;

acquiring the thumbnail media data and data amount information of the original media data corresponding to the thumbnail media data; and displaying the thumbnail media data and the data amount information.

On a second aspect, an embodiment of the disclosure provides a device for browsing network data, and the device includes:

a requesting unit, configured to request for acquisition of network data which includes thumbnail media data used for the thumbnail display of original media data;

an acquiring unit, configured to acquire the thumbnail media data and data amount information of the original media data corresponding to the thumbnail media data; and a displaying unit, configured to display the thumbnail media data and the data amount information.

In the embodiments of the disclosure, the data amount information of the original media data is acquired, and both the data amount information and the thumbnail media data are displayed for a user of an Internet terminal equipment, so that the user may obtain the relevant information of the original media data, and unnecessary data acquiring operations of the user may be reduced, thereby reducing the network traffic waste and prolong the standby time of the Internet terminal equipment.

DETAILED DESCRIPTION OF THE EMBODIMENTS

The technical solutions of the disclosure will be further illustrated below via specific embodiments in conjunction with the drawings.

Figure 1:
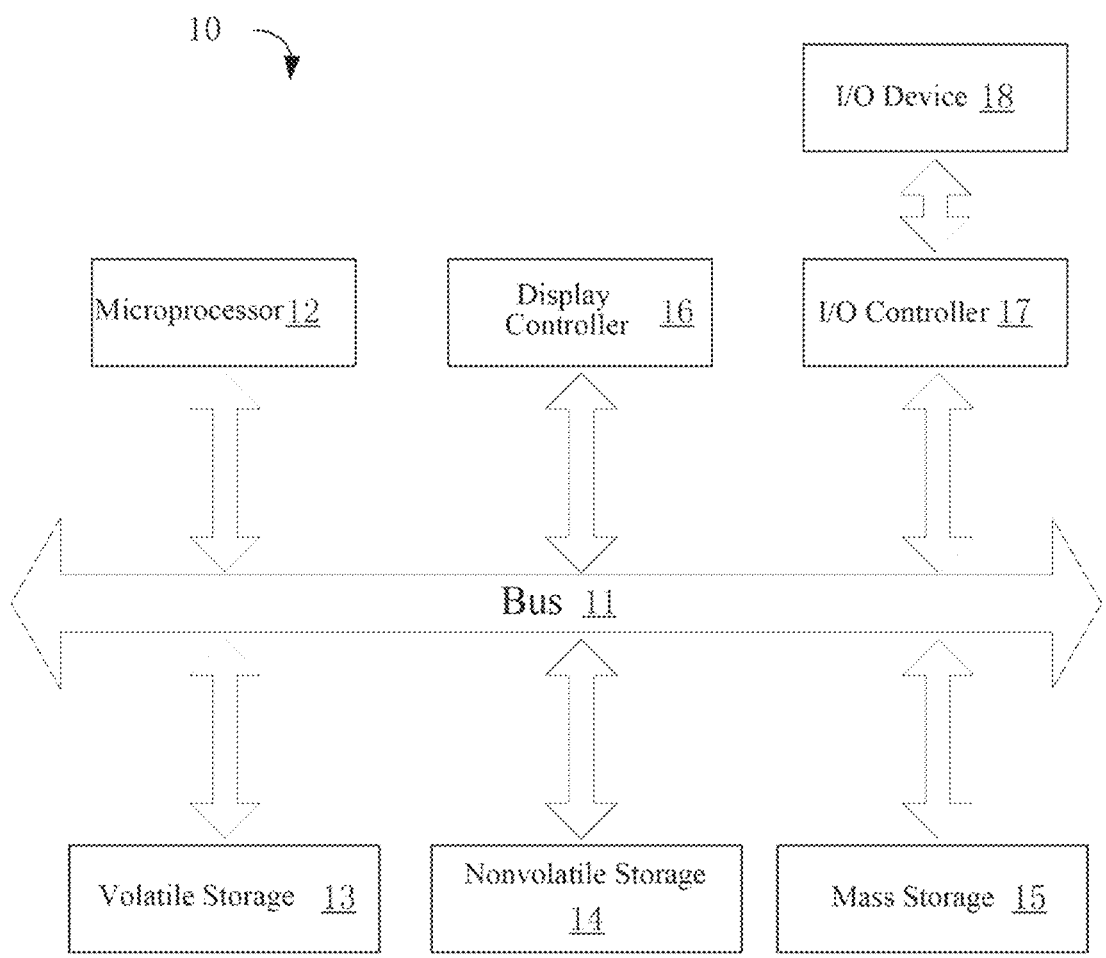
FIG. 1 is a schematic diagram of a typical data processing system applicable to the method for browsing network data according to an embodiment of the disclosure.

The system shown in FIG. 1 is an example of a typical data processing system applied to an embodiment of the disclosure. It may be understood by one skilled in the art that, although a plurality of components of a data processing system are illustrated in FIG. 1, the data processing system is not limited to any specific architecture or component connection modes. It should be further noted that a network computer and other data processing systems that contain more or less components may be applied to the disclosure.

As shown in FIG. 1, a data processing system 10 includes a bus 11. A microprocessor 12, a volatile storage 13 and a nonvolatile storage 14 and/or a mass storage 15 are all connected to the bus 11, to exchange data and communicate with each other via the bus 11. The microprocessor 12 may be an independent processor, or one or more processor groups. The bus 11 further connects the above components of the data processing system 10 to a display controller 16, a display device and an input/output (I/O) device 17. The input/output (I/O) device 17 at least includes a network interface that is configured to receive and transmit network data in a wireless or wired mode, and further includes at least one of a mouse, a keyboard, a modem, a touch input device, a gesture input device, a printer and other devices well-known in the art. Typically, the input/output device 17 is connected with the system via an input/output controller 18.

In the embodiment of the disclosure, the volatile storage 13 in the computer system 10 is also referred to as a memory, which has a characteristic of fast data read/write speed; specifically, the volatile storage 13 may be implemented by a Dynamic Random Access Memory (DRAM), which is required to be continuously powered so as to update or maintain the data in the storage. In an embodiment of the disclosure, a storage region is arranged in the volatile storage 13 as a buffer region for buffering data.

Generally, the data stored on the nonvolatile storage 14 will still present even after the shortage of power to the storage, and the nonvolatile storage 14 may include, for example, a Read-Only Memory (ROM) and a Flash Memory. Typically, the nonvolatile storage 14 is used for storing a program necessary for system startup, or other programs.

Generally, the mass storage 15 may be a magnetic hard disk or an optical disk, or other types of storage systems for storing mass data. In certain cases, the mass storage 15 may be replaced by a Flash memory with a large data capacity. The mass storage 15 can keep the mass data after the system is powered off. Although the mass storage 15 is shown in FIG. 1 as a local equipment directly connected with other components of the data processing system, it should be understood by one skilled in the art that a remote mass storage, such as a network storing device connected with the data processing system via a network interface such as a modem or an Ethernet interface, may be alternatively used in the disclosure. The bus 11 may include one bus, or more buses connected with each other via a plurality of bridges, controllers and/or adapters well-known in the art. In the embodiments, the I/O controller 18 includes a universal serial bus (USB) adapter for controlling peripheral USB equipment, an IEEE1394 controller for controlling peripheral IEEE1394 equipment, or a Bluetooth controller for controlling peripheral Bluetooth equipment, and a peripheral equipment controller applicable to other peripheral equipments.

Examples of typical data processing systems that may be used in the embodiments of the disclosure have been described above. It may be understood by one skilled in the art that the above data processing systems may be formed in different forms based on the above architectures, for example, formed as a mobile phone, a tablet computer, an ultrabook computer, a desktop computer, a Moving Picture Experts Group Audio Layer III (MP3) player or a Moving Picture Experts Group Audio Layer IV (MP4) player.

It may be understood by one skilled in the art that all or a part of some embodiments of the disclosure may be implemented via a computer program. That is, the embodiments of the disclosure may be implemented in the computer system 10 or other data processing system by executing a sequence of instructions contained in a storage by the processor of a microprocessor, herein, the storage may be a volatile storage or a remote storing device. In embodiments of the disclosure, a hardline circuit may be combined with software instructions so as to implement the embodiments. Thus, the present disclosure is not limited to any specific combination of hardware circuits and software, or limited to any specific instruction source executed by the data processing system. Additionally, in the detailed description of embodiments, various functions and operations are described to be executed via computer codes or initiated by computer codes so as to simplify the description, which means that the function may be implemented by executing codes via a processor, as understood by one skilled in the art.

Figure 2:
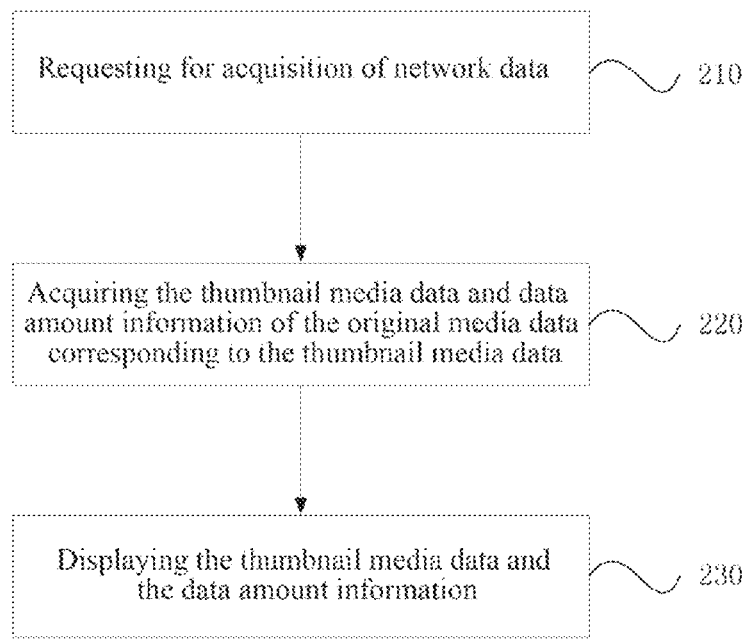
FIG. 2 is a flow chart of a method for browsing network data according to an embodiment of the disclosure.

FIG. 2 is a flow chart of a method for browsing network data according to an embodiment of the disclosure. As shown in FIG. 2, the method is operable on a device for browsing network data and includes the following Steps 210 to 230.

Step 210: requesting for acquisition of network data which includes thumbnail media data used for the thumbnail display of original media data.

Specifically, the network data may be web page data or micro-blog data intended to be provided to a client for use. In a preferred embodiment, the original media data may be image data, and the thumbnail media data may be thumbnail image data, which has a less image size and a less data amount in comparison with the original image, to favourably reduce the total data amount of the network data and increase the network data reading speed on the terminal side.

In another preferred embodiment, the original media data may be video stream data, and the thumbnail media data may be the thumbnail image data of the video stream data, where the thumbnail image data may be used to partially display the content of a certain frame of the video stream data; furthermore, the thumbnail image data apparently has an less data amount, to favourably reduce the total data amount of the network data and increase the network data reading speed on the terminal side.

Step 220: acquiring the thumbnail media data and the data amount information of the original media data corresponding to the thumbnail media data.

Figure 3:
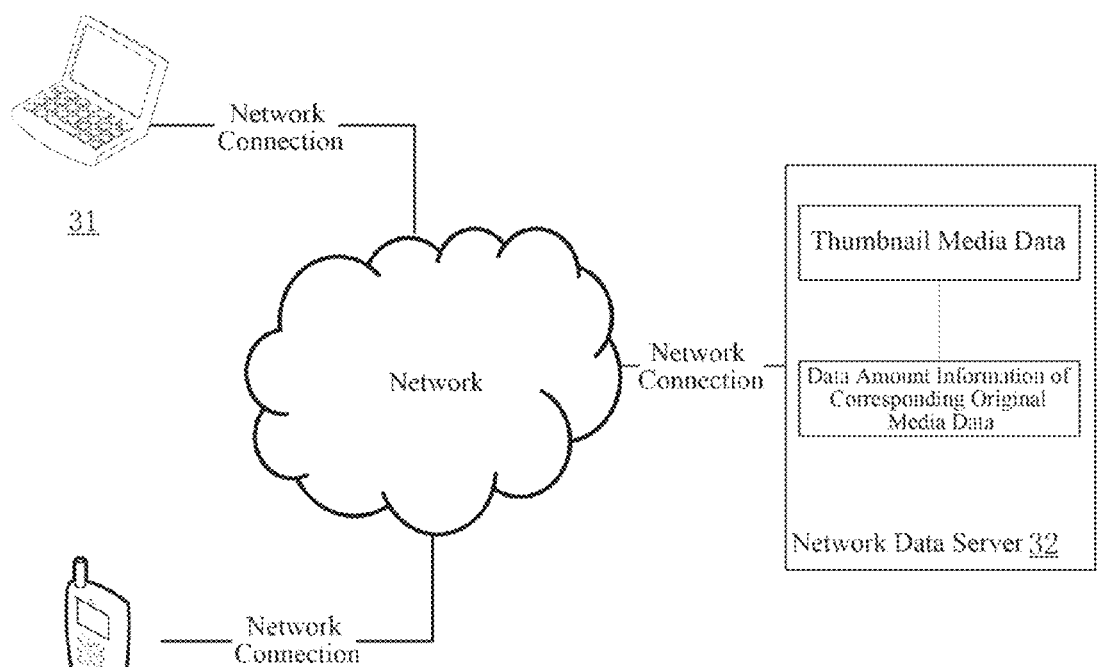
FIG. 3 is a schematic diagram of a network system applicable to the method for browsing network data according to an embodiment of the disclosure.

A schematic diagram of a network system implementing this embodiment is shown in FIG. 3. A terminal 31 is connected via a network to a network data server 32 for storing network data. The original media data may be stored on the network data server 32, or stored on other servers that can be accessed via the network. In this embodiment, the thumbnail media data and the data amount information of the original media data corresponding to the thumbnail media data are bound and stored on the network data server 32, so that the terminal can obtain the data amount information of the original media data bound with the thumbnail media data when acquiring the thumbnail media data via a preset interface.

Thereby, both the thumbnail media data and the data amount information of the original media data that is bound to the thumbnail media data in advance are acquired at Step 220.

The present embodiment, which applies certain requirements on the data stored on the server 32, is more applicable to a situation where network data is provided by a server dedicated for Internet applications, for example, a situation where network data is provided to a microblog terminal by a server dedicated for microblog.

Step 230: displaying the thumbnail media data and the data amount information.

Figure 4:
FIG. 4 is a schematic diagram showing an illustrative web page displayed by the method for browsing network data according to the embodiment of the disclosure.
Figure 4:

Specifically, as shown in FIG. 4, when the network data is displayed, the data amount information of the original media data corresponding to the thumbnail media data is displayed below the thumbnail media data, for the reference by a user, so that the user may determine whether to further acquire the original media data corresponding to the thumbnail media data according to the data amount information.

In this embodiment, the data amount information of the original media data is acquired and both the data amount information and the thumbnail media data are displayed for a user, so that the user of an Internet terminal may be aware of the relevant information of the original media data, to reduce unnecessary data acquiring operations of the user, thereby reducing the waste of network traffic and prolonging the standby time of the Internet terminal.

Figure 5:
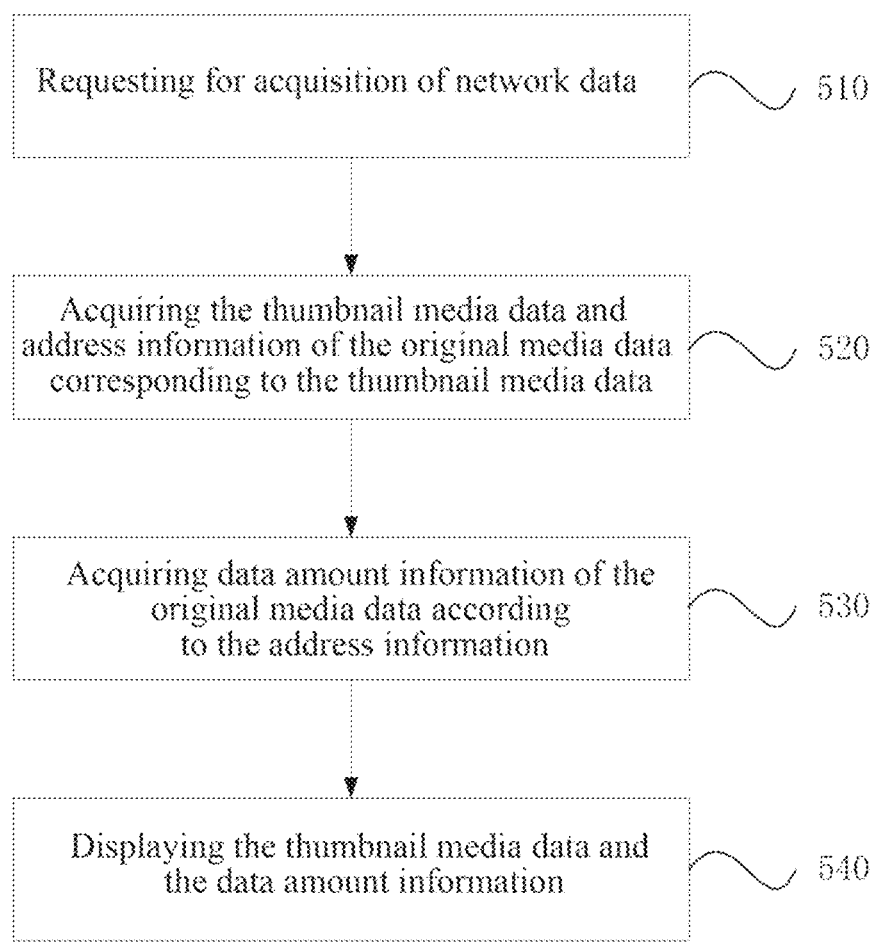
FIG. 5 is a flow chart of a method for browsing network data according to another embodiment of the disclosure.

FIG. 5 is a flow chart of a method for browsing network data according to the another embodiment of the disclosure. As shown in FIG. 5, the method is operable on a device for browsing network data and includes the following Steps 510 to 540.

Step 510: requesting for acquisition of network data which includes thumbnail media data used for the thumbnail display of original media data.

Specifically, the network data may be web page data or micro-blog data intended to be provided to a client for use. In a preferred embodiment, the original media data may be image data, and the thumbnail media data may be thumbnail image data, which has a less image size and a less data amount in comparison with the original image, to favourably reduce the total data amount of the network data and increase the network data reading speed on the terminal side.

In another preferred embodiment, the original media data may be video stream data, and the thumbnail media data may be the thumbnail image data of the video stream data, where the thumbnail image data may be used to partially display the content of a certain frame of the video stream data; furthermore, the thumbnail image data apparently has an less data amount, to favourably reduce the total data amount of the network data and increase the network data reading speed on the terminal side.

Step 520: acquiring the thumbnail media data and address information of the original media data corresponding to the thumbnail media data.

Figure 6:
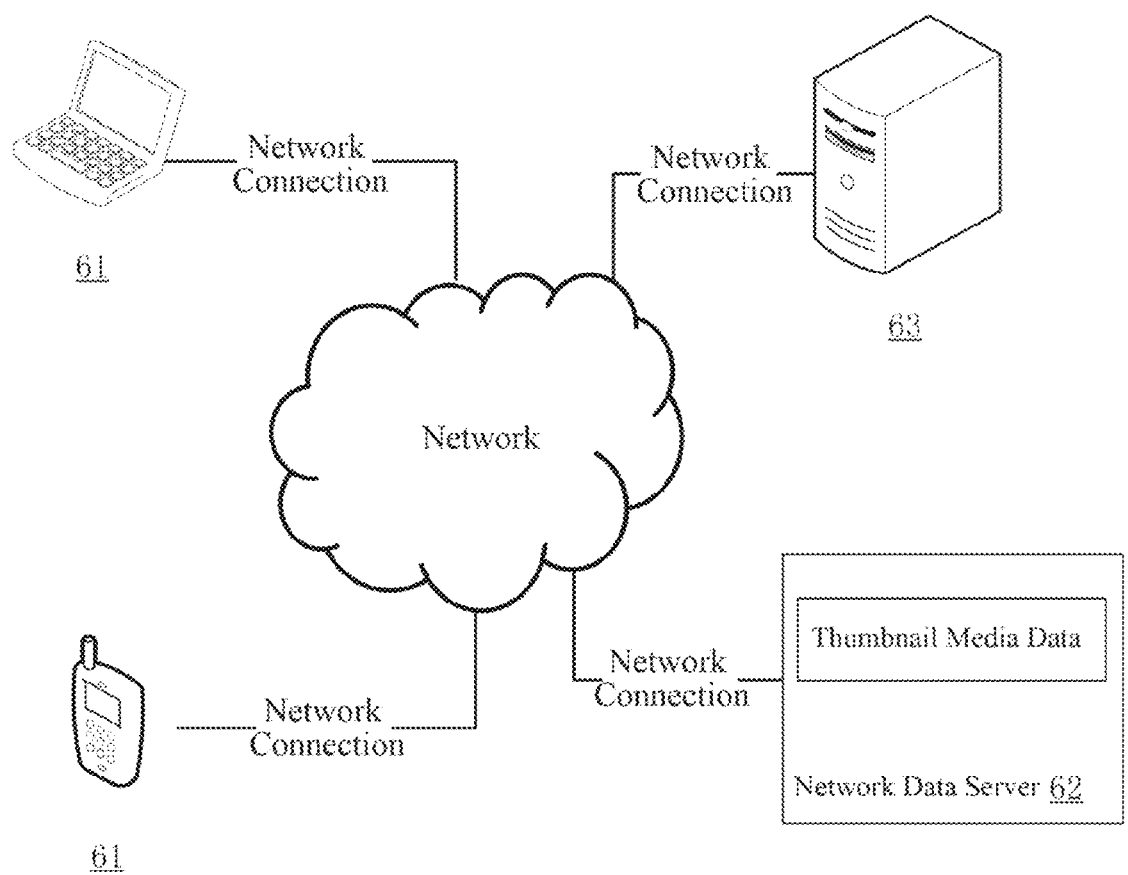
FIG. 6 is a schematic diagram of another network system applied to the method for browsing network data according to an embodiment of the disclosure.

A schematic diagram of a network system implementing this embodiment is as shown in FIG. 6. A terminal 61 is connected via a network to a network data server 62 for storing network data. The original media data may be stored on the network data server 62, or stored on other servers that can be accessed via the network. Particularly, through the network, the terminal 61 may be connected to an information acquiring server 63 for acquiring the relevant information of the original media data. In this embodiment, the server 62 does not need to bind and store the thumbnail media data and the data amount information of the original media data corresponding to the thumbnail media data in advance. To facilitate accessing the original media data by the user, the network data including the thumbnail media data typically further includes the address information of the original media data, which directs to a server on which the original media data is stored, so that a browser or an Internet application client may access the original media data via the address information of the original media data.

Step 530: acquiring data amount information of the original media data according to the address information.

The terminal 61 may conveniently acquire the data amount information of the original media data via the address information of the original media data. In a preferred embodiment, the terminal 61 sends the acquired address information to the information acquiring server 63, which then acquires the data amount information of the original media data by accessing the server stored with the original media data according to the address information, and returns the data amount information to the terminal 61. In this way, the data amount information of the original media data is acquired via the information acquiring server 63 uniformly, so that the server stored with the original media data does not need to be accessed repeatedly in the case that different terminals 61 request for the data amount information of the same original media data; thereby improving the processing efficiency.

In another preferred embodiment, the terminal 61 may directly request for the acquisition of the data amount information of the original media data from the server stored with the original media data. In this way, the terminal 61 acquires the data amount information without transferring by the information acquiring server 63, so that the speed of the acquiring process may be improved.

Because no change is required for the network data server 62 storing the network data in this embodiment compared with that in the prior art, this embodiment has wider applicability and may be applicable to a situation in which a web page is browsed via a network browser.

Step 540: displaying the thumbnail media data and the data amount information.

Specifically, as shown in FIG. 4, when the network data is displayed, the data amount information is displayed below the thumbnail media data, for the reference by the user, so that the user may determine whether to further acquire the original media data corresponding to the thumbnail media data according to the data amount information.

In this embodiment, the address information of the original media data is acquired and then the data amount information of the original media data is acquired according to the address information, and both the data amount information and the thumbnail media data are displayed for a user, so that the user of an Internet terminal may be aware of the relevant information of the original media data, to reduce unnecessary data acquiring operations of the user, thereby reducing the waste of network traffic and prolonging the standby time of the Internet terminal.

Figure 7:
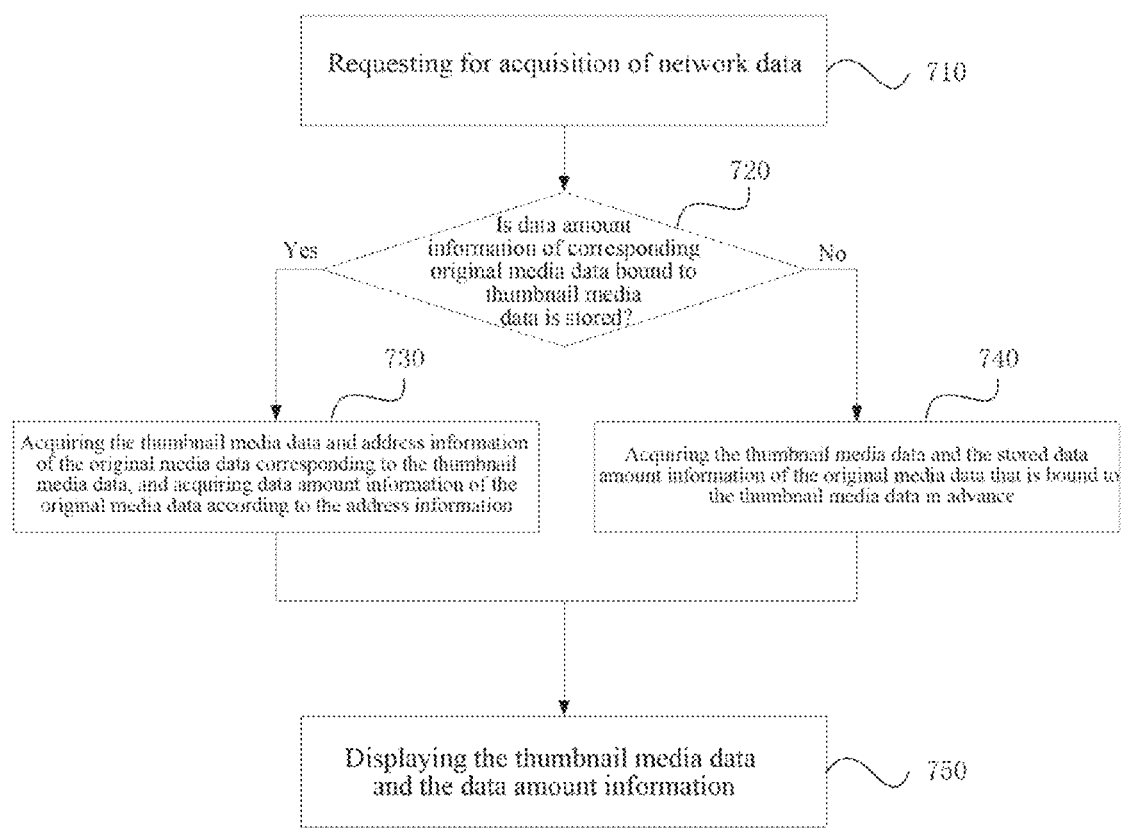
FIG. 7 is a flow chart of a method for browsing network data according to still another embodiment of the disclosure.

FIG. 7 is a flow chart of a method for browsing network data according to the still another embodiment of the disclosure. As shown in FIG. 7, the method is operable on a device for browsing network data and includes the following Steps 710 to 750.

Step 710: requesting for acquisition of network data, which includes thumbnail media data used for the thumbnail display of original media data.

Step 720: querying a server, on which the thumbnail media data are stored, whether data amount information of the corresponding original media data that is bound with the thumbnail media data is stored on the server; and if the data amount information is not stored on the server, performing Step 730; otherwise, performing Step 740.

Step 730: when the data amount information is not stored on the server, acquiring the thumbnail media data and the address information of the original media data corresponding to the thumbnail media data, acquiring the data amount information of the original media data according to the address information, and then performing Step 750.

Specifically, in this Step 730, the data amount information may be acquired by the information acquiring server 63 as shown in FIG. 6, or be acquired by the terminal directly according to the address information.

Step 740: when the data amount information is stored on the server, acquiring the thumbnail media data, as well as the data amount information of the original media data that is bound to the thumbnail media data in advance.

Step 750: displaying the thumbnail media data and the data amount information.

In this embodiment, the terminal queries the server stored with the thumbnail media data (for example, the network data server 32 in FIG. 3) whether the data amount information of the original media data that is bound with the thumbnail media data is stored on the server; and if the data amount information of the original media data is stored on the server, the data amount information may be directly acquired; otherwise, if the data amount information of the original media data is not stored on the server, the address information is acquired and then the file information is acquired according to the address information, so that the data amount information of the original media data is acquired. Therefore, in this embodiment, when the data amount information is stored on the network data server, the data amount information may be acquired rapidly; and when the bound data amount information is not stored, the data amount information can still be acquired, so that a compromise is made between speed and applicability.

Figure 8:
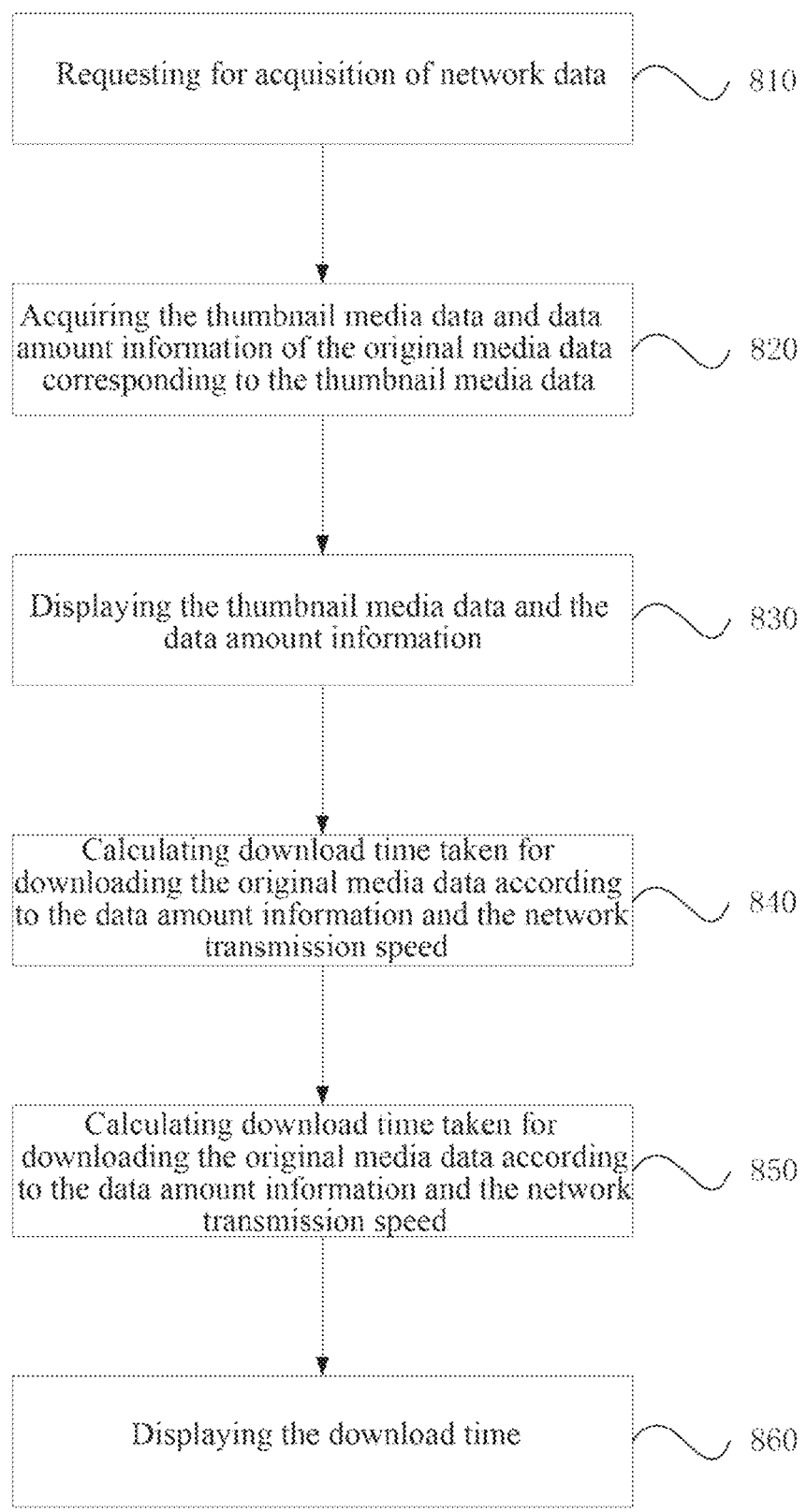
FIG. 8 is a flow chart of a method for browsing network data according to yet still another embodiment of the disclosure.

FIG. 8 is a flow chart of a method for browsing network data according to the yet still another embodiment of the disclosure. As shown in FIG. 8, the method is operable on a device for browsing network data and includes the following Steps 810 to 860.

Step 810: requesting for acquisition of network data, which includes thumbnail media data used for the thumbnail display of original media data.

Step 820: acquiring both the thumbnail media data and data amount information of the original media data corresponding to the thumbnail media data.

Specifically, in Step 820, the data amount information may be acquired by the method related to any one of the above embodiments.

Step 830: displaying the thumbnail media data and the data amount information.

Step 840: estimating a network transmission speed.

Specifically, the network transmission speed may be estimated according to the speed of downloading a part or all of the network data, or the network transmission speed may be estimated according to the network status (for example, the wireless signal strength) at the current moment or in a preset time period. It may be understood by one skilled in the art that, any method for estimating the network transmission speed on the terminal side may be applicable to this step.

Step 850: calculating download time taken for downloading the original media data according to the data amount information and the network transmission speed.

After acquiring the data amount information of the original media data and estimating the network transmission speed, the download time taken for downloading the original media data may be calculated easily according to both of the data amount information of the original media data and the estimated the network transmission speed.

Step 860: displaying the download time.

Figure 9:
FIG. 9 is a schematic diagram showing the illustrative web page displayed at a terminal through the method for browsing network data according to the yet still another embodiment of the disclosure.
Figure 9:

Specifically, as shown in FIG. 9, the download time may be displayed together with the thumbnail and the data amount information displayed in the above Step 840.

It may be understood by one skilled in the art that, in this embodiment, Steps 840 to 860 may be performed after Step 830. However, the arrangement of the steps in the method to implement the acquiring and displaying of the download time is not limited to the case as described above, and Steps 840 to 860 may be performed after Step 820 and in parallel with Step 830; or, Step 840 may be performed before or in parallel with Step 820, and at the same time, Step 850 is performed after Step 820, while Step 860 and Step 830 may be performed concurrently.

In this embodiment, an estimated download time taken for downloading the original media data may be shown to the user by acquiring the network transmission speed and then estimating the download time taken for downloading the original media data, so that the user may make a more reasonable selection according to the network connection status, and the traffic of the Internet terminal may be further saved.

Figure 10:
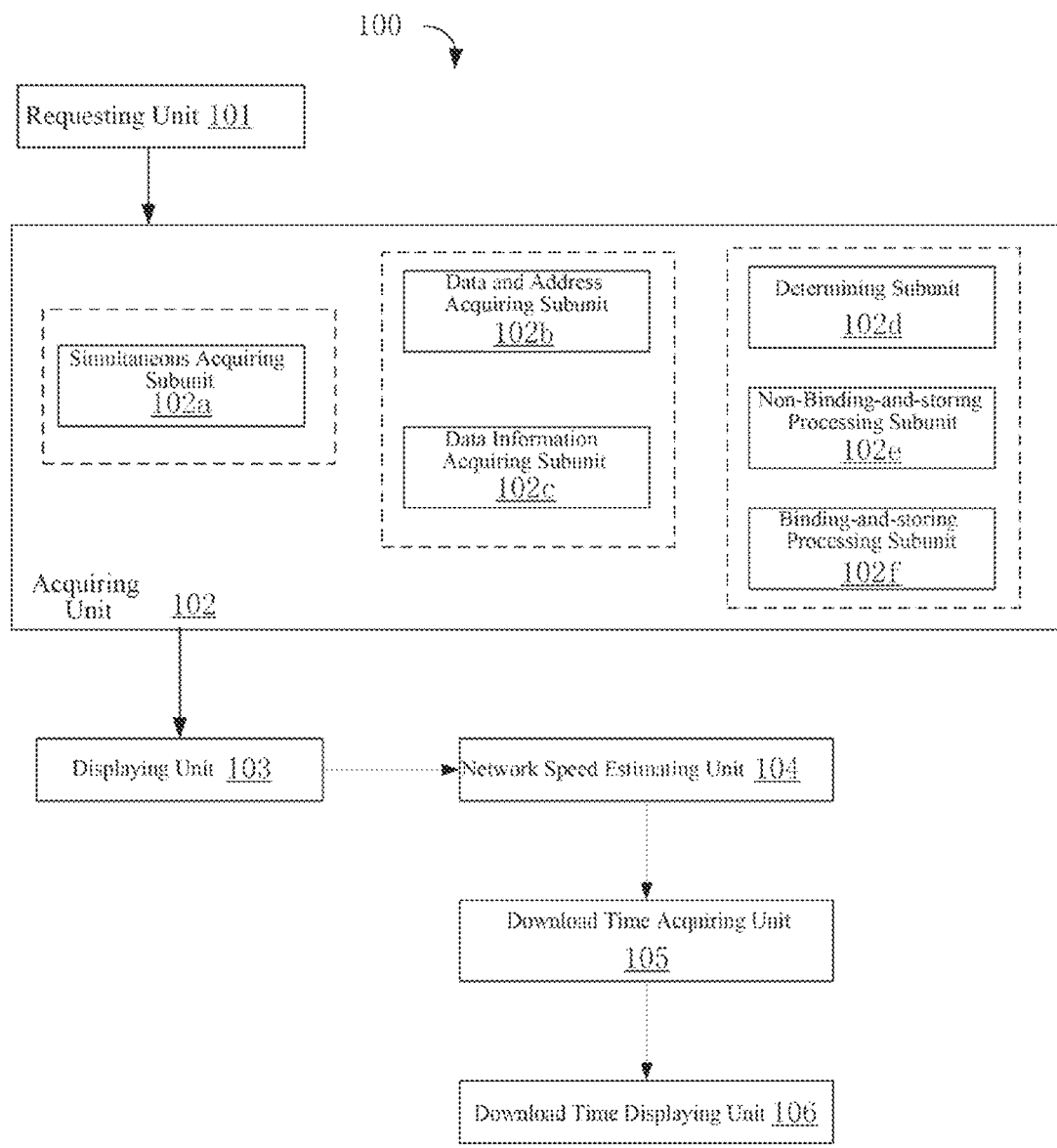
FIG. 10 is a schematic diagram of a device for browsing network data according to a further embodiment of the disclosure.

FIG. 10 is a schematic diagram of a device for browsing network data according to a further embodiment of the disclosure. As shown in FIG. 10, the device for browsing network data 100 includes a requesting unit 101, an acquiring unit 102 and a displaying unit 103.

The requesting unit 101 is configured to request for acquisition of network data, which includes thumbnail media data used for the thumbnail display of original media data. The acquiring unit 102 is configured to acquire the thumbnail media data and data amount information of the original media data corresponding to the thumbnail media data. The displaying unit 103 is configured to display the thumbnail media data and the data amount information.

Specifically, the network data may be web page data or micro-blog data intended to be provided to a client for use. In a preferred embodiment, the original media data may be image data, and the thumbnail media data may be thumbnail image data, which has a less image size and a less data amount in comparison with the original image, to favourably reduce the total data amount of the network data and increase the network data reading speed on the terminal side.

In another preferred embodiment, the original media data may be video stream data, and the thumbnail media data may be the thumbnail image data of the video stream data, where the thumbnail image data may be used to partially display the content of a certain frame of the video stream data; furthermore, the thumbnail image data apparently has an less data amount, to favourably reduce the total data amount of the network data and increase the network data reading speed on the terminal side.

The acquiring unit 102 may be configured with different functions depending on the practical situation so as to be applicable to different applications.

In a preferred implementation of this embodiment, the acquiring unit 102 further includes a simultaneous acquiring subunit 102*a*, which is configured to acquire the thumbnail media data and the stored data amount information of the original media data that is bound to the thumbnail media data in advance.

In this implementation, the thumbnail media data and the data amount information of the original media data corresponding to the thumbnail media data are bound and stored on the network data server stored with the thumbnail media data, so that the terminal can obtain the data amount information of the original media data bound with the thumbnail media data when acquiring the thumbnail media data via a preset interface. The present implementation, which applies certain requirements on the data stored on the network data server, is more applicable to a situation in which network data is provided by a server dedicated for Internet applications, for example, a situation in which network data is provided to a microblog terminal by a server dedicated for microblog.

In another preferred implementation of this embodiment, the acquiring unit 102 further includes a data and address acquiring subunit 102b and a data information acquiring subunit 102c.

The data and address acquiring subunit 102b is configured to acquire the thumbnail media data and the address information of the original media data corresponding to the thumbnail media data; and the data information acquiring subunit 102c is configured to acquire the data amount information of the original media data according to the address information.

The present implementation, where the network data server for storing the network data is not changed compared with that in the prior art, has wider applicability, and may be applicable to a situation in which a web page is browsed via a network browser.

Another preferred implementation of this embodiment has more flexible applicability, where the acquiring unit 102 includes a determining subunit 102d, a non-binding-and-storing processing subunit 102e and a binding-and-storing processing subunit 102f.

The determining subunit 102d is configured to query a server stored with the thumbnail media data whether the data amount information of the corresponding original media data that is bound with the thumbnail media data is stored; the non-binding-and-storing processing subunit 102e is configured to, when the data amount information is not stored on the server, acquire the thumbnail media data as well as the address information of the original media data corresponding to the thumbnail media data, and acquire the data amount information of the original media data according to the address information; and the binding-and-storing processing subunit 102f is configured to, when the data amount information is stored on the server, acquire the thumbnail media data as well as the stored data amount information of the original media data that is bound to the thumbnail media data in advance.

In this embodiment, the terminal queries the server stored with the thumbnail media data whether the data amount information of the original media data that is bound with the thumbnail media data is stored on the server; and if the data amount information of the original media data is stored on the server, the data amount information may be directly acquired; otherwise, if the data amount information of the original media data is not stored on the server, the address information is acquired and then the file information is acquired according to the address information, so that the data amount information of the original media data is acquired. Therefore, in this embodiment, when the data amount information is stored on the network data server, the data amount information may be acquired rapidly; and when the bound data amount information is not stored, the data amount information can still be acquired, so that a compromise is made between speed and applicability.

Further in this implementation, an estimated download time taken for downloading the original media data under an estimated network status may be further provided to the user. In the corresponding preferred implementation, the device for browsing network data 100 further includes a network speed estimating unit 104, a download time acquiring unit 105 and a download time displaying unit 106.

The network speed estimating unit 104 is configured to estimate a network transmission speed; the download time acquiring unit 105 is configured to calculate the download time taken for downloading the original media data according to the data amount information and the network transmission speed; and the download time displaying unit 106 is configured to display the download time.

In this implementation, an estimated download time taken for downloading the original media data may be shown to the user by acquiring the network transmission speed and then estimating the download time taken for downloading the original media data, so that the user may make a more reasonable selection according to the network connection status, and the traffic of the Internet terminal may be further saved.

Therefore, in the embodiment of the disclosure, the data amount information of the original media data is acquired and both the data amount information and the thumbnail media data are displayed for a user, so that the user of an Internet terminal may be aware of the relevant information of the original media data, to reduce unnecessary data acquiring operations of the user, thereby reducing the waste of network traffic and prolonging the standby time of the Internet terminal.

An embodiment of the disclosure further provides a storage medium containing computer-executable instructions, which, when executed by a computer processor, are configured to perform steps of:

requesting for acquisition of network data, which includes thumbnail media data used for the thumbnail display of original media data;

acquiring the thumbnail media data and data amount information of the original media data corresponding to the thumbnail media data; and displaying both the thumbnail media data and the data amount information.

Optionally, the acquiring the thumbnail media data and data amount information of the original media data corresponding to the thumbnail media data includes:

acquiring the thumbnail media data and address information of the original media data corresponding to the thumbnail media data; and acquiring the data amount information of the original media data according to the address information.

Optionally, the acquiring the thumbnail media data and data amount information of the original media data corresponding to the thumbnail media data includes:

acquiring the thumbnail media data and the stored data amount information of the original media data that is bound to the thumbnail media data in advance.

Optionally, the acquiring the thumbnail media data and data amount information of the original media data corresponding to the thumbnail media data includes:

querying a server stored with the thumbnail media data whether the data amount information of the corresponding original media data that is bound to the thumbnail media data is stored on the server;

when the data amount information is not stored on the server, acquiring the thumbnail media data and the address information of the original media data corresponding to the thumbnail media data, and acquiring the data amount information of the original media data according to the address information; and when the data amount information is stored on the server, acquiring the thumbnail media data and the stored data amount information of the original media data that is bound to the thumbnail media data in advance.

Optionally, the method further includes:
estimating a network transmission speed;
calculating the download time taken for downloading the original media data according to the data amount information and the network transmission speed; and
displaying the download time.

Optionally, the original media data is image data, and the thumbnail media data is thumbnail image data.

Optionally, the original media data is video stream data, and the thumbnail media data is thumbnail image data of the video stream data.

Apparently, it should be understood by one skilled in the art that, each module or each step in the above embodiments may be implemented via a universal computing device, and may be integrated on a single computing device or distributed on a network consisted of a plurality of computing devices. Optionally, the modules or steps may also be implemented via computer-executable program codes, which may be stored on a storing device and executed by a computer device; or, the modules or steps may be respectively manufactured as an integrated circuit module; or, a plurality of modules or steps thereof may be embodied as a single integrated circuit module. Therefore, the disclosure is not limited to any specific combination of hardware and software.

The above embodiments are not intended to limit the disclosure, and for one skilled in the art, various modifications and variations may be made to the disclosure. Therefore, all modifications, equivalent substitutions and improvements made without departing from the concept and principles of the disclosure should be contemplated by the protection scope of the disclosure.

What is claimed is:

1. A method for browsing network data, which is operable on a device for browsing network data, wherein the method comprises:
   requesting for acquisition network data which includes thumbnail media data used for a thumbnail display of original media data;
   acquiring the thumbnail media data and data amount information of the original media data corresponding to the thumbnail media data by:
   querying a server, on which the thumbnail media data is stored, whether the data amount information of the corresponding original media data that is bound to the thumbnail media data is stored on the server;
   when the data amount information is not stored on the server, acquiring the thumbnail media data and address information of the original media data corresponding to the thumbnail media data and acquiring the data amount information of the original media data according to the address information; and
   when the data amount information is stored on the server, acquiring the thumbnail media data and the stored data amount information of the original media data that is bound to the thumbnail media data in advance; and
   displaying the thumbnail media data and the data amount information.

2. The method of claim 1, further comprising:
estimating a network transmission speed;
calculating download time taken for downloading the original media data according to the data amount information and the network transmission speed; and
displaying the download time.

3. The method of claim 1, wherein, the original media data is image data, and the thumbnail media data is thumbnail image data.

4. The method of claim 1, wherein, the original media data is video stream data, and the thumbnail media data is thumbnail image data of the video stream data.

5. A device for browsing network data, comprising:
   a requesting unit, configured to request for acquisition network data which includes thumbnail media data used for a thumbnail display of original media data;
   an acquiring unit, configured to acquire the thumbnail media data and data amount information of the original media data corresponding to the thumbnail media data, wherein the acquiring unit comprises:
      a determining subunit, configured to query a server, on which the thumbnail media data is stored, whether the data amount information of the corresponding original media data that is bound to the thumbnail media data is stored on the server;
      a non-binding-and-storing processing subunit configured to, when the data amount information is not stored on the server, acquire the thumbnail media data and address information of the original media data corresponding to the thumbnail media data, and acquire the data amount information of the original media data according to the address information; and
      a binding-and-storing processing subunit configured to, when the data amount information is stored on the server, acquire the thumbnail media data and the stored data amount information of the original media data that is bound to the thumbnail media data in advance; and
   a displaying unit, configured to display the thumbnail media data and the data amount information.

6. The device of claim 5, further comprising:
a network speed estimating unit, configured to estimate a network transmission speed;
a download time acquiring unit, configured to calculate download time taken for downloading the original media data according to the data amount information and the network transmission speed; and
a download time displaying unit, configured to display the download time.

7. The device of claim 5, wherein, the original media data is image data, and the thumbnail media data is thumbnail image data.

8. The device of claim 5, wherein, the original media data is video stream data, and the thumbnail media data is thumbnail image data of the video stream data.

9. A non-transitory storage medium containing computer-executable instructions, which, when executed by a computer processor, are configured to cause the processor to perform a method for browsing network data, the method operable on a device for browsing network data, wherein the method comprises:
   requesting for acquisition network data which includes thumbnail media data used for a thumbnail display of original media data;
   acquiring the thumbnail media data and data amount information of the original media data corresponding to the thumbnail media data by:
      querying a server, on which the thumbnail media data is stored, whether the data amount information of the corresponding original media data that is bound to the thumbnail media data is stored on the server;
      when the data amount information is not stored on the server, acquiring the thumbnail media data and address information of the original media data corresponding to the thumbnail media data, and acquiring the data amount information of the original media data according to the address information; and when the data amount information is stored on the server, acquiring the thumbnail media data and the stored data amount information of the original media data that is bound to the thumbnail media data in advance; and displaying the thumbnail media data and the data amount information.

10. The non-transitory storage medium of claim 9, wherein the method further comprises:

estimating a network transmission speed;

calculating download time taken for downloading the original media data according to the data amount information and the network transmission speed; and displaying the download time.

11. The non-transitory storage medium of claim 9, wherein, the original media data is image data, and the thumbnail media data is thumbnail image data.

\* \* \* \* \*